Figure 1:
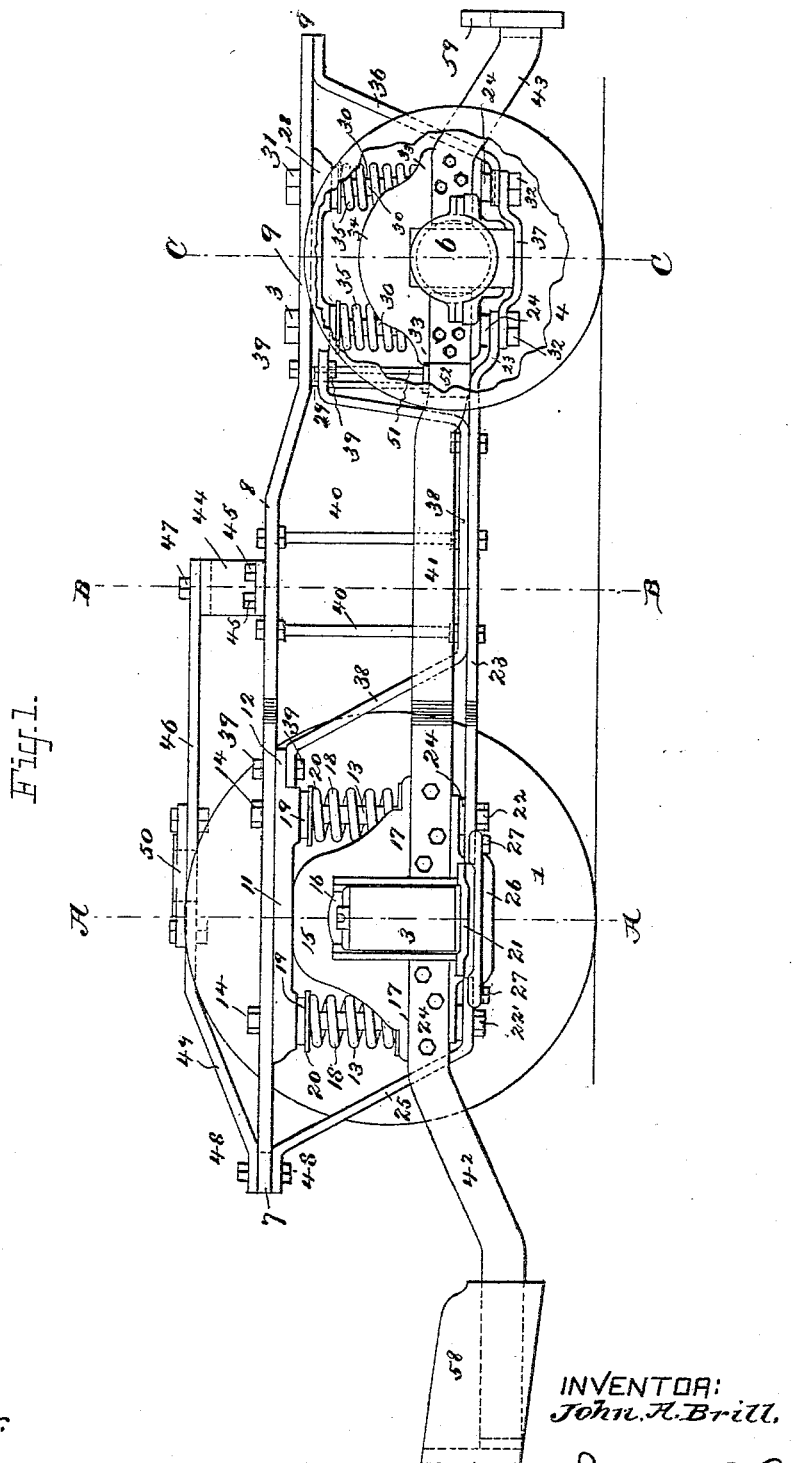

(No Model.)  3 Sheets—Sheet 1.

J. A. BRILL.
MOTOR TRUCK.

No. 504,800. Patented Sept. 12, 1893.

ATTEST:
M. E. Stoddard.
H. F. Durkin.

INVENTOR:
John A. Brill.
By Joseph L. Levy
Attorney

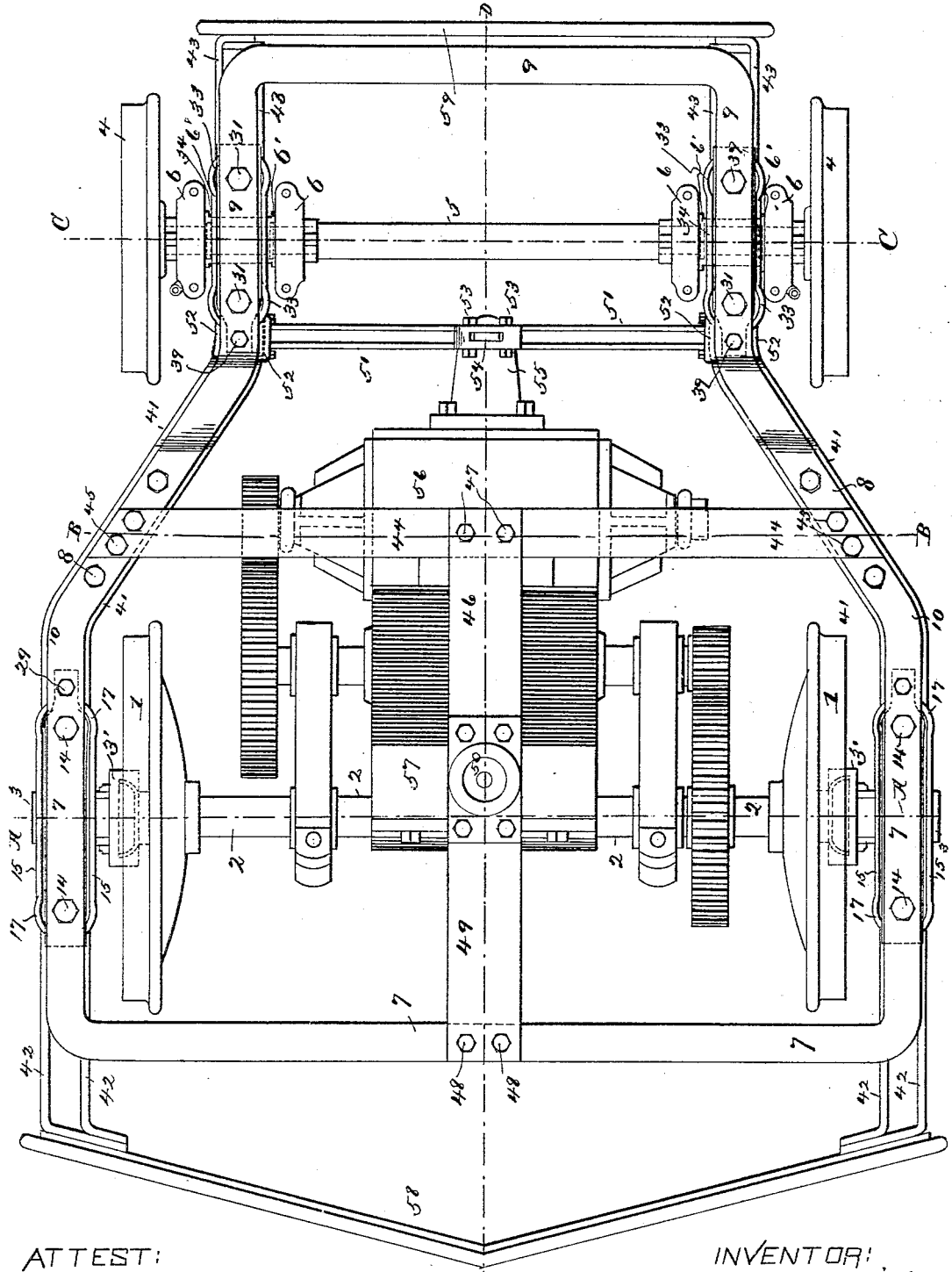

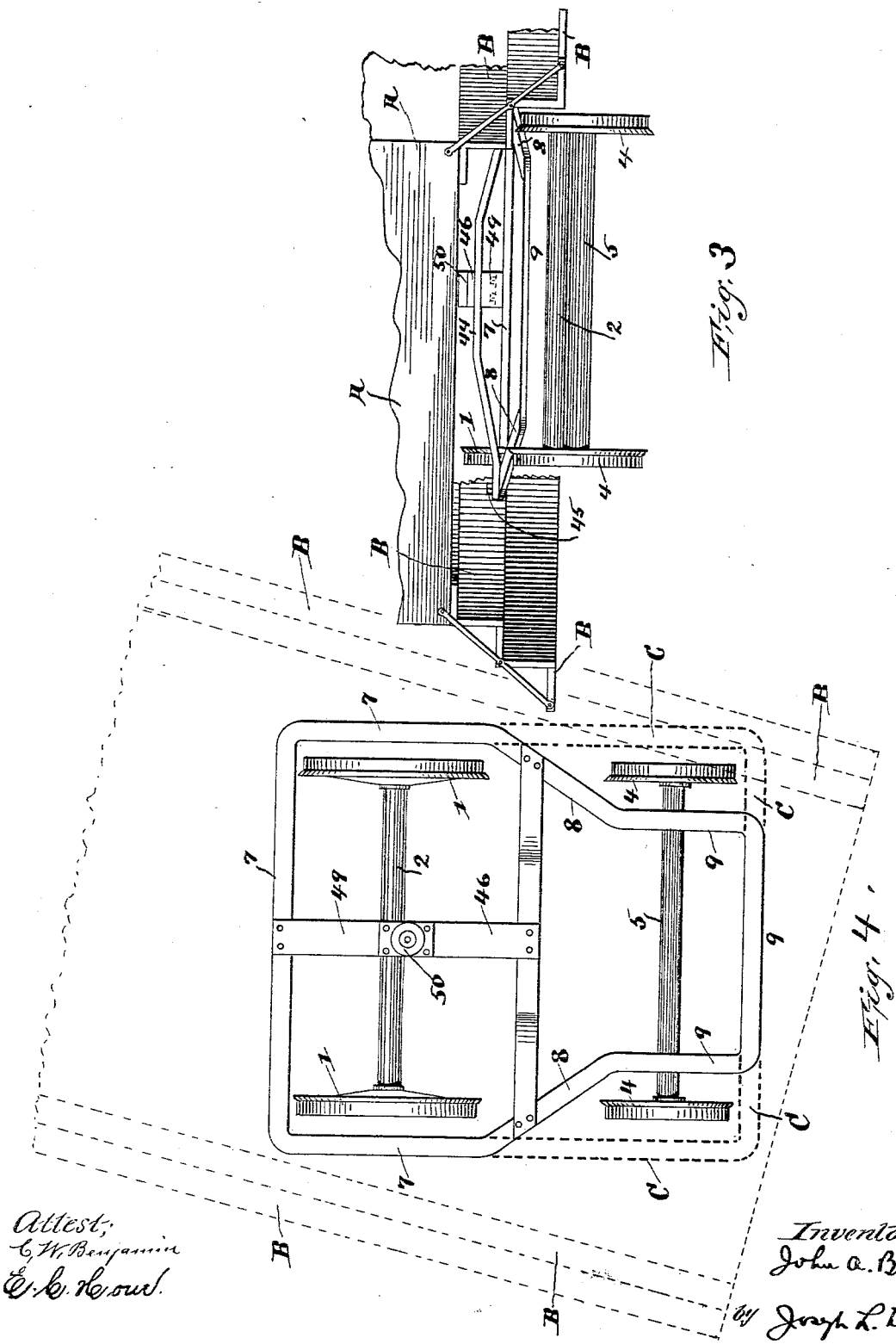

UNITED STATES PATENT OFFICE.

JOHN A. BRILL, OF PHILADELPHIA, PENNSYLVANIA.

MOTOR-TRUCK.

SPECIFICATION forming part of Letters Patent No. 504,800, dated September 12, 1893.

Application filed March 1, 1892. Serial No. 423,343. (No model.)

*To all whom it may concern:*

Be it known that I, JOHN A. BRILL, a citizen of the United States of America, residing at Philadelphia, county of Philadelphia, State of Pennsylvania, have invented certain new and useful Improvements in Motor-Trucks, of which the following is a specification.

My invention has reference primarily to pivotal car trucks in which large and small wheels are used, and in which the pivotal center of the truck is located off the center between the wheel-base center and the center of the axle of the driving or large wheels, and preferably nearly over said axle, which disposition is had for the purpose of increasing the traction of the truck. In this class of trucks a motor, when electric motive power is used, is sleeved upon the axle of the driving wheels, so as to get a preponderance of the weight thereon, the whole aim and object of the comparative location of the parts in this class of trucks being to get a maximum traction with its consequent economy. In the use of this class of truck it is found, by reason of the increased deflection or radiation of the end, which I call the "trailing end," in which the small wheels are contained, that when summer cars are used having steps projecting downward and along the side of the car, the said end will strike the steps or their framing. It is often very disadvantageous, and sometimes impracticable, to so relation the truck to the car as to avoid this, because the framing of the truck usually extends out beyond the wheels, and the width of the street and consequent distance between the tracks often determines the width of the cars. In my present structure I form the entire truck frame and the axle box frame, which is supported on the truck, so that it will turn in and pass inside of the rear or trailing wheels, leaving the space about said wheels, on the outside thereof, free and clear. This inturning of the truck frame I preferably commence a little before the wheel-base center of the truck is reached; or, in other words, I commence at a point preferably between the center of the driving wheel axle and the wheel-base center of the truck to narrow the frame, said narrowing continuing until the pedestal portion of the rear end of the truck frame is reached. In the structure shown herein the narrowing commences at about the inner end of the axle box pedestals for the large or driving wheels, and is continued to the like or same parts of the trailing wheels. This saves considerable room in the width of the truck frame at the rear end, and the truck can have considerable deflection without the trailing end striking the car steps, &c., and no special provision or accommodation in the car need be made therefor. Furthermore, this structure enables me to reduce what is call the "wheel-base" considerably.. This general class of truck has been constructed with a special view of carrying but one motor, one end of which has been sleeved upon the axle of the driving wheel, the free end of which has been supported on a transverse bar secured to the side bars of the axle box frame. In this class of trucks where a portion of the frame extends outside of the trailing wheels this transverse bar could not be placed close to the axle of the trailing wheel, by reason of the fact that it had to pass in front and close to the periphery thereof, and it was found expedient to locate it a considerable distance away from the wheel, in some cases as much as two and one-half inches and more. It will thus be seen that the length of the motor and its support would then determine the distance between the driving wheel axle and the periphery of the trailing wheel. If the diameters of the trailing wheels were increased, this would also tend to increase the wheel-base, as it would cause the cross bar to be located farther away from the axle of the trailing wheel. In the present structure a cross bar for supporting the motor can be fixed to the side bars and located close up to the axle of the trailing wheels and within the periphery of said wheels, so that a consequent reduction of the wheel-base will be had. The reduction of the wheel-base of the truck is always an important desideratum in all trucks, and especially in pivotal trucks, as it enables the truck to more freely take the curves, and in this class of trucks particularly, as it tends to concentrate the weight of the motor and car body on the large driving wheels to which the motive power is applied, where it is most desirable.

My invention further consists in the details of structure hereinafter pointed out.

In the drawings, Figure 1 is a side elevation of my improved truck, the trailing wheel being broken away to show the parts within the same in full. Fig. 2 is a plan view of the same. Fig. 3 is an end elevation of the truck and a superposed car body having depending side steps, illustrating in a diagrammatic way the co-active relationship of the car and truck, the axle boxes and axle box frame being omitted for the sake of clearness in illustration; Fig. 4, a plan view of the truck and superposed car in outline, further illustrating the relative positions of the car and truck when taking a curve.

The driving wheels are represented at 1; and 2 is the axle therefor.

3 is the axle box.

4 are the trailing wheels.

5 is the axle; 6, the axle boxes.

The driving and trailing wheel axles are provided with dust boxes 3' and 6'.

The special construction of the axle boxes for the trailing end and the dust boxes I shall not claim herein, as any suitable or preferable form can be used.

The lines A, B, C, indicate, respectively, the center of the axle of the driving wheel, the wheel-base center, and the center of the axle of the trailing wheels.

The truck frame is composed of the upper chord comprising the sections 7, 8 and 9, the section 7 rectangular on three sides and encompassing the driving wheel, driving axle, and truck center bearing, the section 8 which is deflected from the point 10 in toward the longitudinal axis D of the truck, where it meets the section 9, which is rectangular on three sides and which is entirely within or between the trailing wheels.

I do not limit myself to the particular configuration of the upper chord shown, as the reduction in width can be more abrupt or more gradual as circumstances require, but in all cases the upper chord is made continuous, that is, extends completely round the truck, and I provide a very rigid frame by making the upper chord of the truck of a single piece.

To the section 7 of the upper chord are secured the spring plates 11, which are provided with lugs 12, which spring plates may be either made in one piece, as shown in the drawings, or sectional. The spring posts 13 pass up through the spring plates, and end in the nuts 14, by which they and the spring plates are secured to the upper chord.

15 are the axle box saddles, which rest on elastic cushions 16 seated in the axle boxes 3 (the axle boxes at the trailing end of the truck being likewise pivoted) which saddles are provided with ears 17 forming seats for the axle box springs 18, and encompassing the spring posts 13. The spring posts pass through the ears 17 and end in nuts 22. An elastic cushion 19 and disk 20 lie between the upper end of the springs 18 and the spring plates, through which the spring posts pass. The lower open ends of the saddles 15 are closed by a cross bar 21, secured thereto. The lower chord of the truck frame comprises the cross brace 23, which is secured to the spring posts by the nuts 22 at the driving wheel end, the end of the brace extending past the spring posts, and between it and the ears 17 of the saddle elastic blocks 24 are interposed. Angle braces 25 are secured at their upper ends to the upper chord, and at their lower ends to the spring posts 18, their ends extending past the spring posts, and between said braces and the ears of the saddles are interposed the elastic blocks 24, the spring posts passing through them, the nuts 22' securing the same to the spring posts. A cross bar 26 is secured to the inner ends of the braces 23, 25 by the bolts 27.

The foregoing description will answer for both sides of the driving wheel section of the truck frame.

To the trailing section 9 of the upper chord are secured the spring plates 28, which have projections 29. The spring posts 30, having nuts 31 at the top and 32 at the bottom, pass through ears or projections 33 of the axle box saddles 34, between which projections and the spring plates 28 the axle box springs 35 extend.

The foregoing structure is the same as before described in relation to the driving wheel section of the truck.

An angle brace 36 is secured to the section 9 of the upper chord and the spring posts in substantially the same manner as the angle brace 25 in the driving wheel section; and in the same manner the cross bar 37 is secured to the spring posts. The brace 23 and cross bar 37 have a slight difference in their configuration, owing to the fact that the trailing wheel axle is lower than the driving wheel axle.

Between the projections 12 and 29 of the spring plates 11, 28, extends an arched brace 38, which is secured to said projections and to the upper chord by the bolts 39. Two pillars 40 extend between the upper chord and the arched brace 38, the bolts at their lower ends securing the braces 23 and 28 together, and uniting them with the upper chord.

The axle box frame upon which the cross bar for supporting the free end of the motor is secured, is constructed as follows: The side members or side bars of the axle box frame are composed in three sections, the central section 41, the forward outer section 42, and the rear outer section 43 (Fig. 1). The inner ends of all three sections are secured to the axle box saddles by bolts. Each section is composed of two juxtaposed bars set on edge, secured to the axle box saddles on each side thereof, and between which the lower truck frame bracing and pillars 40 pass. The shape or configuration of the sections 42, 43 of the axle box frame is immaterial, it being only necessary for the purpose of this invention to configure the central section 41 to get the reduction of width between the sections on both sides of the frame on the trailing end of the truck. In order to get this, the section 41 is configured, so that it will converge inwardly toward the central axis D of the truck, until it comes to the trailing wheels, so as to bring the trailing end of the axle box frame within the trailing wheels, as shown in plan, Fig. 2.

The precise configuration of section 41 is immaterial, and I have shown it as being configured and following the same course as section 8 of the upper chord; but this is not necessary, so long as the side bars are deflected or diverged from the driving wheel section of the truck, so as to bring the rear or trailing end of the truck within or between the trailing wheels. This disposition of the axle box frame can be used without a like disposition of the truck frame, so I do not limit myself to the relation of the truck frame and axle box frame, as shown. The axle box frame is substantially independent of the movement of the car body on the truck springs.

The truck bolster is composed of the transverse beam 44 arched upwardly toward the central axis of the truck, as shown in Fig. 1, and secured at its ends by the bolts 45 to the upper chord, and the longitudinal beam 46, which is secured to the transverse arch bar 44 at one end by the bolts 47, and to the upper chord by the bolts 48, it being disposed on the longitudinal center of the truck, and is bent downwardly and upwardly, as the case may be, at 49 to bring it on a level with the highest part of the arch beam 44. The central bearing 50 is secured to the beam 46 nearly over the center of the driving wheel axle. The transverse beam 44 is secured to the upper chord between the pillars 40.

Reference is had to Figs. 3 and 4 in which the relation between the car and truck, and especially the position of each in relation to the other in taking a curve are diagrammatically illustrated.

At A is the car body of the summer or open class provided with steps B of any suitable form, depending from the sides.

The car is provided with the usual center bearing for co-operation with the truck bearing 50 in the usual way.

By reference to Fig. 3 it will be seen that the narrowed portion of the upper chord does not strike the steps in curving, but should the said chord have been continued in the usual rectangular form and be disposed without or outside of the trailing wheels, as shown at C, dotted lines, Fig. 4, it would have come in contact with the car steps, as clearly shown in that figure, whereas the chord 7, 8, 9 is entirely free from contact, and the car would have a greater degree of radiation before the chord would strike the steps. The trailing wheels also clear the steps, so that it can be said that this form of truck permits of a greater movement in the arc of a circle at one end than at the other, the parts being arranged to clear depending steps and the like during the movements of the car on the truck in taking curves. In order to secure these advantages it is not absolutely essential that both the axle box frame and the upper chord be conformed as shown, as the main features of advantage are secured by the conformation of the upper chord and additional advantage obtained by locating the small wheels at the end of the truck having the greatest movement within which lies the reduced portion of the upper chord.

By reference to Fig. 2 particularly, it will be seen that the support for the motor is located very close to the axle 5 of the trailing wheels, and within a line drawn across the truck from the periphery of the same and the parts to which the support is secured permitting, it could be located still closer.

I lay no claim herein to the particular construction of the support for the motor, the one herein shown forming part of the subject matter of an application filed by Walter S. Adams and myself on November 12, 1891, Serial No. 411,752. This support comprises two bars 51 secured at their ends to a thimble 52, which thimble is secured to the side bars of the axle box frame, the transverse bar 51 of the support being set on edge to secure rigidity and strength, and are preferably arched upwardly, the apex of the arch being preferably at the center line of the truck. At this point a thimble 53 rests on the bars 51 from which a pendant 54 depends, the ends of which may carry springs. The pendant supports the free end or nose 55 of the motor 56, the field magnets 57 of which are sleeved or fixed in any desired manner to the driving wheels. The axle box frame carries life guards 58, 59 at each end thereof, and they and the motor support unite its members laterally.

In some of the claims I intend the phrase "truck frame" to include the axle box frame, unless otherwise specified.

The structure which embodies my invention can be materially altered, so far as details and the shape thereof are concerned, without departing from the spirit of my invention.

What I claim is—

1. In a motor truck, the combination of a truck frame, axles and wheels of different diameters, a frame supported on the running gear independently of the truck frame, the said frames being at one end of less diameter between their side members than the distance between the wheels, such reduced ends being supported on the running gear between the smaller wheels, both frames following substantially the same outline, and a support for a motor secured to the reduced end of the independent frame between the parallel vertical planes which are common tangents to the smaller wheels, substantially as described.

2. In a motor truck, the combination, with the wheels, axles, axle-boxes, axle-box saddles and a truck frame, of a frame resiliently supported from the axle-boxes and forming an axle-box frame independent of the truck frame, a motor and a support for one end of the motor secured to the independent frame within the parallel vertical planes which are common tangents to one set of wheels, substantially as described.

3. In a motor truck, the combination of a truck frame, axle boxes, and carrying wheels of different diameters, a frame supported on the axle boxes independently of the truck frame, the independent frame being at one end of less diameter between its side members than the distance between the wheels, such reduced end being supported on axle boxes between the smaller wheels, and a support for the motor secured to the reduced end of the independent frame between the parallel vertical planes which are common tangents to the smaller wheels, substantially as described.

4. A truck having a frame proper, large and small wheels, axle boxes on the axles without the large and within the small wheels, and an additional frame supported independently of the truck frame, both frames being supported on the running gear without the large and within the small wheels, substantially as described.

5. In a motor truck, the combination with driving and trailing wheels, of two frames forming the truck body, having a resilient connection between them, whereby their vertical movements are independent of each other, each of said frames having supports on each axle fore and aft of that axle, one of said frames supporting the car body, and the other carrying a motor support, which lies between the parallel vertical planes which are common tangents to one set of the wheels, substantially as described.

6. In a motor truck, the combination, with driving and trailing wheels, of two frames forming the truck body, having a resilient connection between them, whereby their vertical movements are independent of each other, said frames following substantially the same outline, one of said frames supporting the car body, and the other carrying a motor support which lies between the parallel vertical planes which are common tangents to one set of the wheels, substantially as described.

7. A pivotal truck having wheels, a frame comprising an element for sustaining the pivotal devices, a supplemental element below the first-named between which two the car springs extend, the pivotal devices permitting the truck to have a greater arc of movement at one end than at the other, the frame being so conformed that a portion of the end of the same, including both elements, at which there is the larger arc of movement, will have a lateral vibration within two outer limits more restricted than have the wheels at that end, substantially as described.

8. A pivotal truck having a frame comprising a pivot-plate element and a supplemental element below the first-named, between which two the car springs extend, both elements being wider than the distance between the wheels at one portion and narrower than that distance at another portion, both frames extending between the forward and rear axles with the car springs about the axle boxes at both ends, the pivot plate being within the widest portion of the frame, substantially as described.

9. In a car truck, the combination of a continuous upper chord, having side members inclined inwardly from front to rear a lower chord, of similar construction an arched brace 38 depending from the upper chord, and uniting it with the lower chord, and posts 40 uniting the upper chord with the arched brace, substantially as described.

10. In a car truck, the combination of a continuous upper chord, having side members inclined inwardly from front to rear a lower chord, of similar construction terminal angle braces uniting the upper and lower chords, an intermediate arched brace uniting the same, and vertical struts or posts uniting the same, within the arched brace, substantially as described.

11. A motor truck having axle boxes without the wheels at one end and within the wheels at the other, a continuous upper chord, axle box saddles, and lower braces for them, ears on the saddles and springs between the ears and upper chord, one end of the upper chord being narrower than the other, the narrow end, and its springs and bracing being supported on the inside axle box saddles entirely between the wheels, substantially as described.

12. A motor truck having wheels of different diameters, the larger wheels being at one end, and the smaller at the opposing end, axle boxes without the larger wheels, and within the smaller wheels, and a truck frame comprising a continuous upper chord and lower bracing therefor, axle box saddles, and springs between the axle box saddles and upper chord, one end of the upper chord being narrower than the other, the narrow end and its springs and bracing being supported on the inside axle box saddles entirely within the wheels, substantially as described.

13. In a truck, the combination, with a frame comprising a continuous upper member or chord and bracing secured to and continuous with the sides of the upper chord and depending therefrom, the said bracing following the contour of the said upper chord, one end of said frame being reduced in width to clear the wheels, of running gear and springs between said upper chord and bracing, substantially as described.

14. In a car truck, the combination with the upper chord, of the arched and transverse bolster beam 44 resting upon the upper chord, and the semi-arched beams 46, 49 secured at one end to the beam 44 and to the said chord at the other, and the center bearing 50 on the beam 46, substantially as described.

15. In a motor truck, having driving and trailing wheels, the combination, with the running gear, of an axle box frame uniting the axle boxes and having a support for the motor, and an upper frame, having a motion independent of the motor supporting frame, and receiving the weight of the car body, and transmitting it directly to the driving wheels at points without those wheels, and to the trailing wheels at points within those wheels, substantially as described.

16. The combination, with a car, of a truck having large wheels at one end and smaller wheels at the other, the truck and car being pivotally united so as to secure a greater radial movement between the car and truck at one end than at the other, the sides of the car having secured thereto steps projecting outwardly at a height below the top of the larger wheels, and above the top of the smaller wheels, substantially as described.

Signed at the city of New York, county of New York, and State of New York, this 17th day of February, 1892.

JOHN A. BRILL.

Witnesses:
HERBERT F. DURBUR,
M. E. STODDARD.